United States Patent
Cakulev et al.

(10) Patent No.: US 11,432,222 B2
(45) Date of Patent: Aug. 30, 2022

(54) SUBSCRIPTION-BASED SELECTIVE NETWORK EXECUTION OF MULTIPLE MOBILITY HANDOVER TECHNIQUES

(71) Applicant: Verizon Patent and Licensing Inc., Basking Ridge, NJ (US)

(72) Inventors: Violeta Cakulev, Millburn, NJ (US); Sudhakar Reddy Patil, Flower Mound, TX (US); Hossein M. Ahmadi, Parsippany, NJ (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 94 days.

(21) Appl. No.: 17/108,553

(22) Filed: Dec. 1, 2020

(65) Prior Publication Data
US 2022/0174573 A1    Jun. 2, 2022

(51) Int. Cl.
| | |
|---|---|
| *H04W 36/32* | (2009.01) |
| *H04W 36/00* | (2009.01) |
| *H04W 48/16* | (2009.01) |
| *H04W 36/08* | (2009.01) |
| *H04W 8/08* | (2009.01) |
| *H04W 88/08* | (2009.01) |

(52) U.S. Cl.
CPC ............ *H04W 36/32* (2013.01); *H04W 8/08* (2013.01); *H04W 36/00837* (2018.08); *H04W 36/08* (2013.01); *H04W 48/16* (2013.01); *H04W 88/085* (2013.01)

(58) Field of Classification Search
CPC . H04W 36/32; H04W 8/08; H04W 36/00837; H04W 36/08; H04W 48/16; H04W 88/085
See application file for complete search history.

(56) References Cited

U.S. PATENT DOCUMENTS

| | | | |
|---|---|---|---|
| 2017/0325134 A1* | 11/2017 | Wan ..................... | H04M 15/58 |
| 2020/0367032 A1* | 11/2020 | Macaluso ............... | H04W 4/00 |

* cited by examiner

*Primary Examiner* — Marisol Figueroa

(57) ABSTRACT

A device connected to a wireless network receives, from a mobile user equipment device (UE) associated with a user, a wireless network service request. The device obtains the user's subscribed mobility handover techniques, where the user's subscribed mobility handover techniques include one or more mobility handover techniques selected by the user from multiple different mobility handover techniques associated with at least one wireless network service plan. The device executes the one or more different mobility handover techniques selected by the user for maintaining wireless communication with the mobile UE as the mobile UE moves within the wireless network.

20 Claims, 12 Drawing Sheets

SUBSCRIPTION-BASED SELECTIVE NETWORK EXECUTION OF MULTIPLE MOBILITY HANDOVER TECHNIQUES

BACKGROUND

Mobility management in wireless networks involves the assigning and controlling of wireless links for mobile device connection to the wireless networks. Mobility management functions in the wireless networks may, among other functions, determine when link transfers from a mobile device, between wireless access interfaces, need to occur, and coordinate such link transfers. The link transfers may be called "hand offs," and the performed functions may be called "hand off management." Mobility management in wireless networks, such as, for example, Fourth Generation (4G), 4.5G, Fifth Generation (5G) wireless networks, and proposed future wireless networks, typically include two components: location management and handoff management. The location management function tracks the attachment points of mobile devices between consecutive communications. The handoff management function maintains a mobile device's connection as the mobile device moves and changes its access point to the wireless network.

DETAILED DESCRIPTION OF THE PREFERRED EMBODIMENTS

Figure 1:
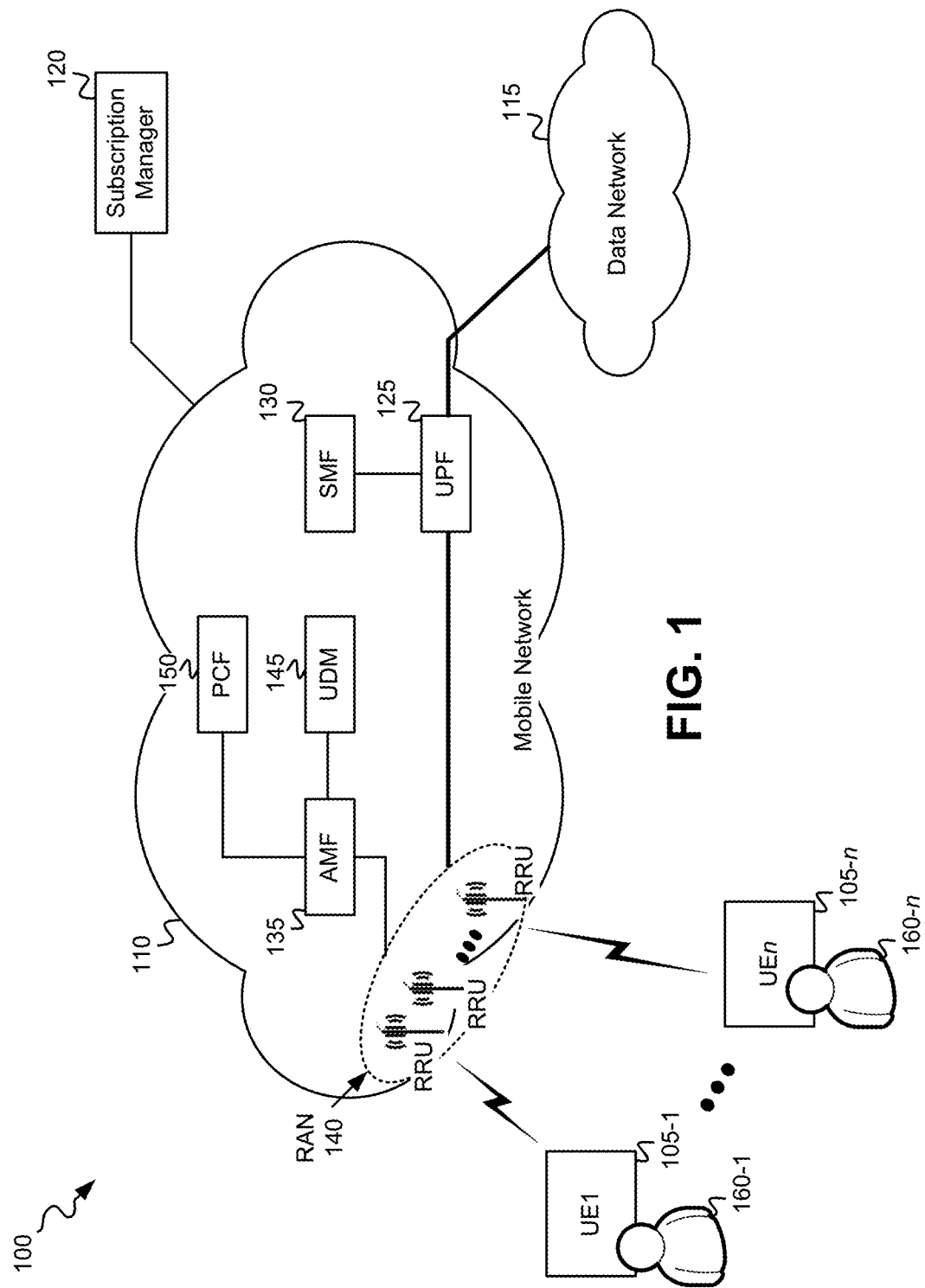
FIG. 1 depicts an exemplary network environment in which subscriber-selected mobility handover techniques may be executed by the network during movement of the subscriber's mobile device.

The following detailed description refers to the accompanying drawings. The same reference numbers in different drawings may identify the same or similar elements. The following detailed description does not limit the invention, which is defined by the claims.

During hand off management in mobile networks, wireless network service to a mobile device may be handed off from a source cell of the network, in which the mobile device currently is located, to a target cell of the network into which the mobile device is traveling. During standard techniques of handover between cells in a mobile network, there is a brief time period, called the "mobility interruption time" (also called "cell handover latency") when the mobile device cannot transmit or receive data as the mobile device switches between the source cell to the target cell. In some existing mobile networks, the cell handover latency can be in the range of 30-60 milliseconds, depending on effective radio conditions and other factors. Proposed Next Generation networks are intended to support ultra-reliable low-latency communication (URLLC) that includes having a high reliability and availability, and having a very low end-to-end latency (e.g., in the range of a few milliseconds). To enable URLLC, proposed Next Generation networks are seeking to significantly reduce the cell handover latency between cells in the mobile network.

A number of handover techniques, beyond standard cell handover, can be implemented within a mobile network to improve and optimize cell handover performance so as to reduce the cell handover latency between cells and increase handover reliability. Two such handover techniques include Dual Active Protocol Stack (DAPS) handover and Condition Handover (CHO). DAPS involves eliminating the mobility interruption time by having the link in the source cell remain active for reception and transmission of data until link establishment in the target cell is complete and the mobile device is able to send and receive data in the target cell. In DAPS, simultaneous transmission and reception of user data occurs over the links in both the source cell and the target cell during the handover procedure, and switches from the source cell to the target cell upon completion of the handover procedure. DAPS, therefore, requires the mobile device to simultaneously receive and transmit data in both the source cell and the target cell for a short period of time during the handover procedure, as well as requiring new functionality in the Radio Access Network of the mobile network to support DAPS signaling.

CHO is a handover technique that involves preparing multiple candidate target cells for handover instead of a single target cell. By preparing multiple candidate target cells, the actual handover from the source cell to one of the multiple candidate target cells can occur earlier than standard handover when radio conditions have not yet deteriorated at the edge of the source cell. CHO places new functional requirements on both the mobile device and the Radio Access Network of the mobile network.

Exemplary embodiments described herein enable a network service subscriber to subscribe to one or more upgraded mobility handover techniques for improving handoff performance involving the subscriber's mobile wireless device. In some embodiments, the network service subscriber may subscribe to one of multiple different network service plans, where each of the network service plans may offer a different set of upgraded mobility handover techniques. The set of upgraded mobility handover techniques subscribed to by the subscriber may include DAPS and/or CHO and other mobility handover techniques not specifically described herein. Subscriber data indicating whether upgraded mobility handover techniques are allowed for a subscriber, and further indicating which upgraded mobility handover techniques are allowed for the subscriber, may be stored within the wireless network. The stored subscriber data may be subsequently retrieved for enabling the Radio Access Network to execute the subscribed upgraded mobility handover techniques when the subscriber's mobile device receives network service from the wireless network.

FIG. 1 depicts an exemplary network environment 100 in which a subscriber may select, and subscribe to, particular mobility handover upgrades, as part of the subscriber's network service subscription, and the subscriber-selected mobility handover techniques may subsequently be executed by the network during movement of the subscriber's mobile device. As shown, network environment 100 includes user equipment devices (UEs) 105-1 through 105-n, a mobile network 110, a data network 115, and a subscription manager 120.

UEs 105-1 through 105-n (referred to herein as a "UE 105" or "UEs 105") may each include any type of mobile electronic device having a wireless communication capability. UE 105 may include, for example, a laptop, palmtop, wearable, or tablet computer; a cellular phone (e.g., a "smart" phone); a Voice over Internet Protocol (VoIP) phone; an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user/subscriber may carry, use, administer, and/or operate each UE 105. A user 160-1 is shown in association with UE 105-1 and a user 160-n is shown in association with UE 105-n.

Mobile network 110 may include any type of Public Land Mobile Network (PLMN), such as a Next Generation mobile network (e.g., a 5G mobile network) or a Long-Term Evolution (LTE) mobile network (e.g., a 4G or 4.5G mobile network). Data network 115 may include one or more interconnected networks, such as local area networks (LANs), wide area networks (WANs), metropolitan area networks (MANs), and/or the Internet. Subscription manager 120 includes one or more network devices that connect to mobile network 110 and which receive network service subscription information from users 160s as described further below with respect to FIG. 6.

In the exemplary implementation of FIG. 1, mobile network 110 is shown as including a 5G mobile network that further includes 5G network components, such as a User Plane Function (UPF) 125, a Session Management Function (SMF) 130, an Access and Mobility Management Function (AMF) 135, a Radio Access Network (RAN) 140, a Unified Data Management (UDM) function 145, and a Policy Control Function (PCF) 150. UPF 125, SMF 130, AMF 135, RAN 140, UDM 145, and PCF 150 may represent the core network components of mobile network 110.

UPF 125 includes, or is executed by, a network device that acts as a router and a gateway between mobile network 110 and data network 115, and forwards session data between data network 115 and RAN 140. Though only a single UPF 125 is shown in FIG. 1, mobile network 110 may include multiple UPFs 125 disposed at various geographic locations in network 110. SMF 130 includes, or is executed by, a network device that performs session management, allocates network addresses to UEs 105, and selects and controls UPFs 125 for data transfer. AMF 135 includes, or is executed by, a network device that performs UE-based authentication, authorization, and mobility management for UEs 105. RAN 140 may include various types of radio access equipment that implement radio access communication with UEs 105. The radio access equipment of RAN 140 may include, for example, base band units (not shown) and multiple remote radio units (RRUs). In some implementations, the RRUs may each include a Central Unit (CU) and one or more Distributed Units (DUs) (not shown). Each of the RRUs includes a device(s) that operates as a radio function unit which transmits and receives radio frequency (RF) signals to/from UEs 105. RAN 140 may additionally include other nodes, functions, and/or components not shown in FIG. 1.

UDM 145 includes, or is executed by, a network device that manages data for user access authorization, user registration, and data network profiles. UDM 145 may include, or operate in conjunction with, a User Data Repository (UDR) (not shown) which stores user data, such as customer profile information, customer authentication information, and encryption keys for the information. PCF 150 includes, or is executed by, a network device that implements policy and charging control for service data flows and Protocol Data Unit (PDU) session related policy control.

The configuration of network components of network environment 100 is shown in FIG. 1 is for illustrative purposes. Other configurations may be implemented. Therefore, network environment 100 may include additional, fewer, and/or different components that may be configured in a different arrangement than that depicted in FIG. 1. For example, though mobile network 110 is depicted in FIG. 1 as a 5G network with 5G network components/functions, mobile network 110 may alternatively include a 4G or 4.5G network with corresponding network components/functions, or a hybrid Next Generation/4G network that includes certain components of both a Next Generation network and a 4G network. As another example, though subscription manager 120 is shown in FIG. 1 as being connected to mobile network 110, in alternative implementations subscription manager 120 may instead connect to data network 115. In this alternative implementation, subscription manager 120 may store and retrieve user subscription information from UDM 145 via data network 115 and mobile network 110.

Figure 2:
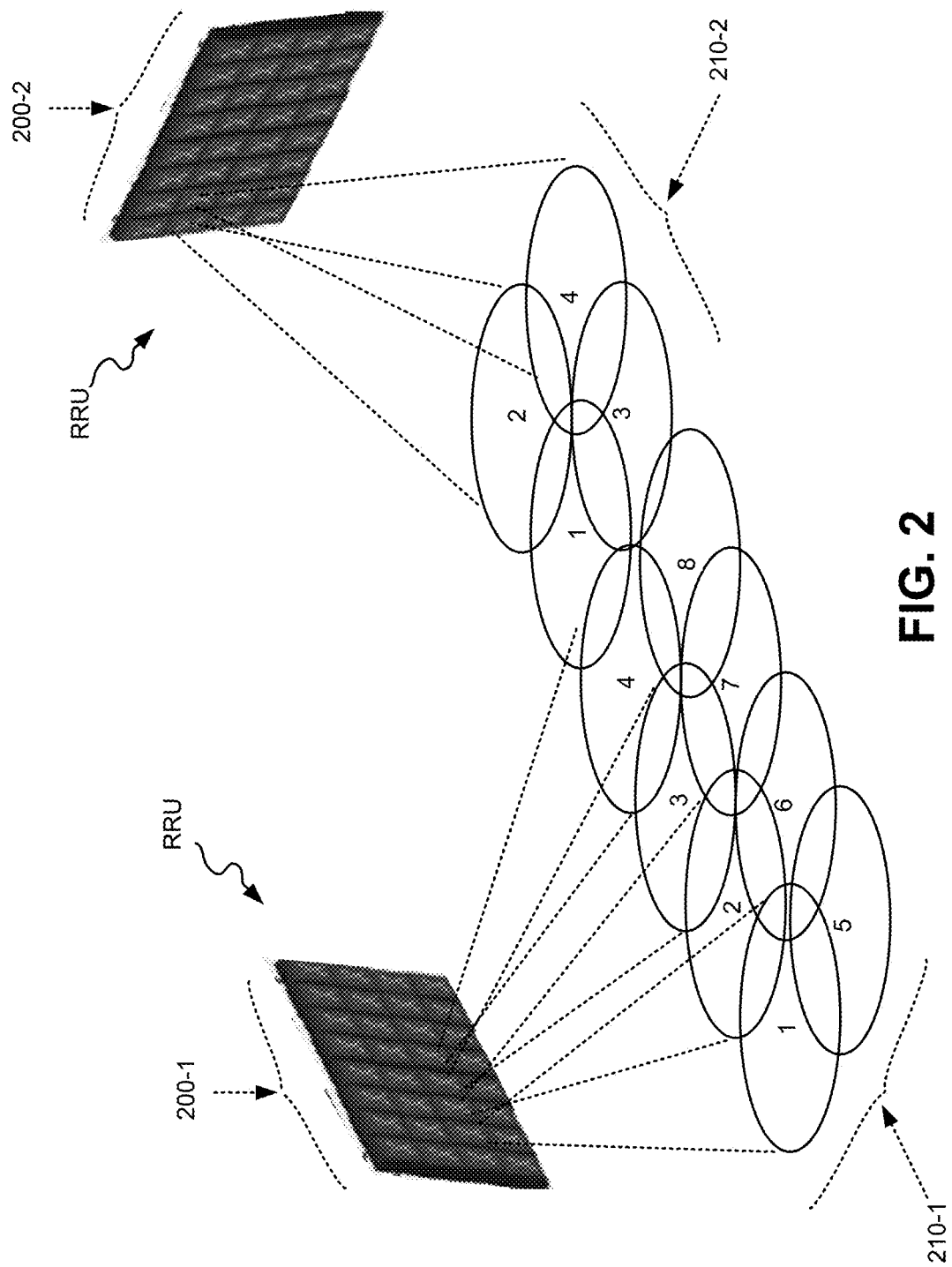
FIG. 2 illustrates an example of a wireless network coverage area produced by Remote Radio Units of the Radio Access Network of FIG. 1.

FIG. 2 illustrates an example of a wireless network coverage area produced by RRUs of RAN 140. Each RRU may include one or more antenna arrays, such as a first antenna array 200-1 shown for a first RRU and a second antenna array 200-2 shown for a second RRU in FIG. 2. Each antenna array 200, via respective antenna beams of the antennas of the array, generates respective wireless network coverage areas 210. The wireless network coverage areas 210 may be composed of multiple cells that are formed by respective antenna beam patterns associated with each of the antennas of the antenna arrays 200. Each of the antenna arrays 200 shown in FIG. 2 may produce a wireless network coverage area 210 within which UEs 155 may transmit to, and receive from, antenna arrays 200 via wireless RF transmissions. The wireless network coverage areas 210 may provide wireless connections for UEs 105 over particular geographic areas.

FIG. 2 depicts a simplified example in which eight antenna beams of antenna array 200-1 generate respective overlapping cells (numbered 1 through 8) that produce the wireless network coverage area 210-1 and four antenna beams of antenna array 200-2 generate respective overlapping cells (numbered 1 through 4) that produce the wireless network coverage area 210-2. For simplicity, the wireless network coverage areas 210-1 and 210-2 in FIG. 2 show only a portion of the cells associated with respective antenna arrays 200-1 and 200-2. A UE 105 (not shown) may transit between cells (e.g., between cell 1 and cell 6 of coverage area 210-1, or between cell 1 and cell 5 of coverage area 210-1), and the wireless network enables wireless network service to continue by "handing off" the UE 105 from one cell to the next.

Antenna arrays 200-1 and 200-2 (referred to herein as "antenna array 200" or "antenna arrays 200") may each include an array of antennas, such as, for example, a Full Dimension Multiple Input Multiple Output (FD-MIMO) or massive MIMO antenna array, that may form antenna beams in horizontal and/or vertical directions to enable each array of antennas to cover a three-dimensional space in the vicinity of each array 200. For example, each antenna array 200 may include a number of horizontal antennas and a number of vertical antennas arranged in a row(s) and column (s) configuration. As an example, an antenna array 200 may include a 2×4 array with the number of vertical antennas equaling the number of rows (e.g., 2) and the number of horizontal antennas equaling the number of columns (e.g., 4). Alternatively, each antenna array 200 may include an m×n (m rows by n columns), where m is a number of vertical antennas in the array 200 and n is a number of horizontal antennas in the array 200, m and n may be any positive integer greater than or equal to one, and m and n may or may not equal one another.

As described further below, a UE 105 (not shown) may move within the wireless network coverage areas 210 of network 110 and network service for the UE may be handed off from an initial cell to an adjacent cell as the UE transits from a coverage area associated with the initial cell to a coverage area associated with the adjacent cell.

Figure 3:
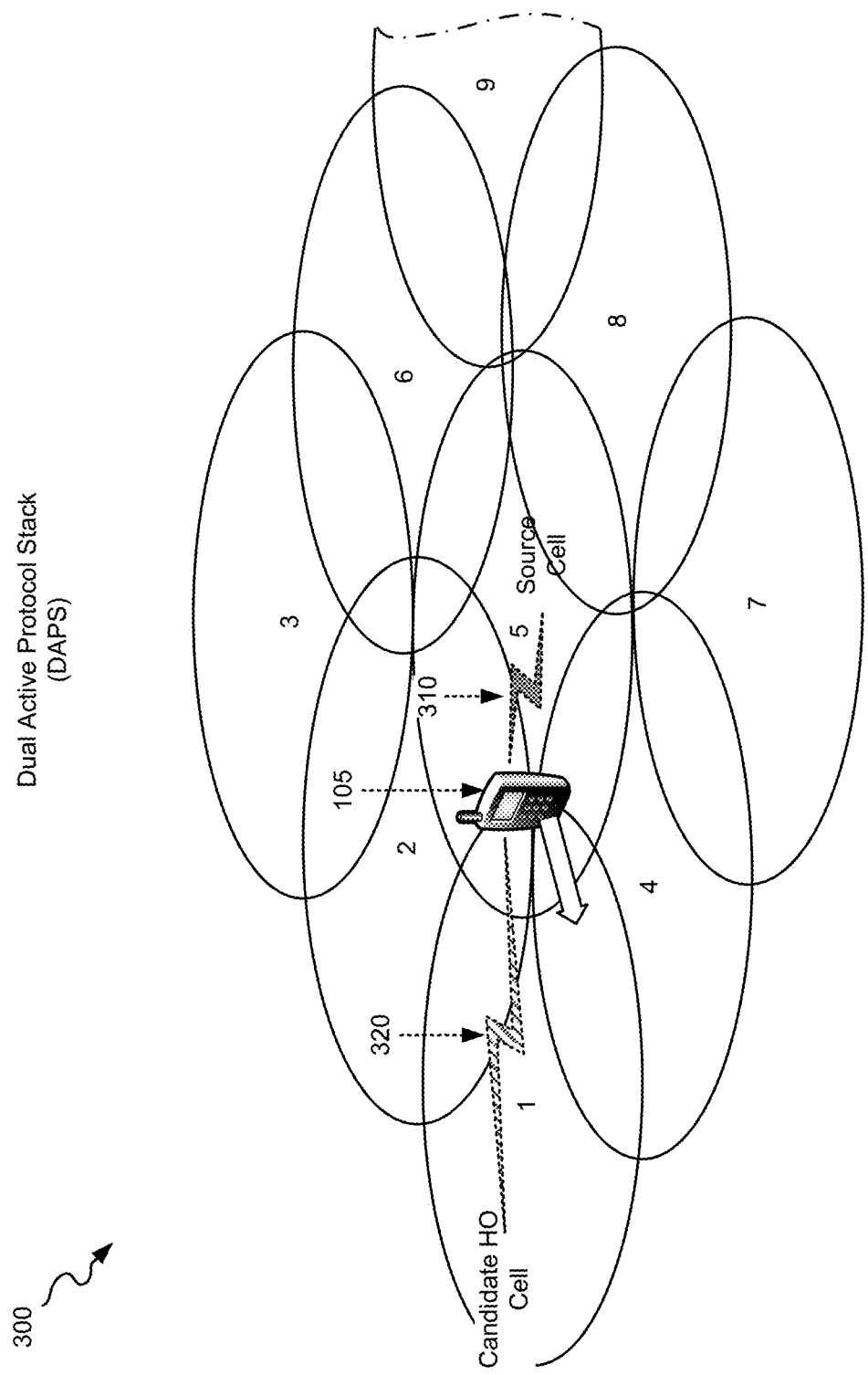
FIG. 3 illustrates an example of the use of a Dual Active Protocol Stack mobility handover technique that can be used for enhancing handoff performance within the Radio Access Network of FIG. 1.

FIG. 3 illustrates an example of the use of a DAPS mobility handover technique that can be used for enhancing handoff performance for a UE 105 within RAN 140 of network 110. The DAPS mobility handover technique may be used as an alternative to standard handover techniques by RAN 140 of network 110. As shown in the example of FIG. 3, UE 105 is moving from a geographic area covered by cell 5 towards a geographic area covered by cell 1. Using DAPS, the UE 105's existing link in source cell 5 remains active while a new link 320 in candidate handoff cell 1 is established and UE 105 continues to receive and transmit data within the source cell 5. Once the new link 320 is established, and reception of data via the candidate HO cell 5 by UE 105 begins, the link in the source cell 5 may be relinquished to complete the DAPS handover. The DAPS handover technique, thus, enables the execution of handoff between a first cell and a second cell with communication overlap between the cells thereby ensuring minimal cell handover latency.

Figure 4:
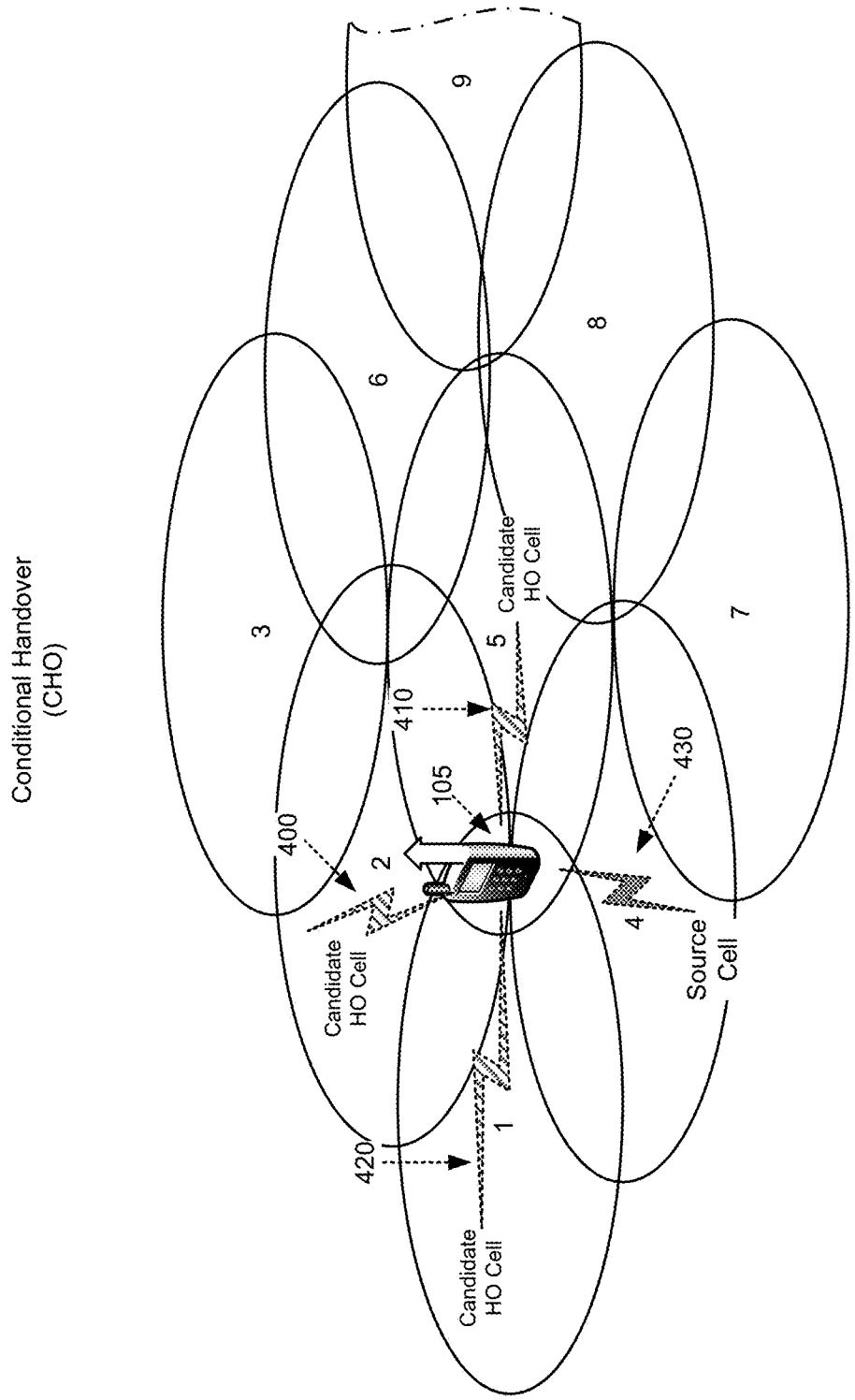
FIG. 4 illustrates an example of the use of a Conditional Handover mobility handover technique that can also be used for enhancing handoff performance within the Radio Access Network of FIG. 1.

FIG. 4 illustrates an example of the use of a CHO mobility handover technique that can also be used for enhancing handoff performance for a UE 105 within RAN 140 of network 110. The CHO mobility handover technique may be used either as an alternative to standard handover techniques or to the DAPS handover technique, or may be used in conjunction with the DAPS handover technique described above. As shown in the example of FIG. 4, UE 105 is moving from a geographic area covered by source cell 4 towards a geographic area covered by candidate handoff cell 2, and passing through overlapping portions of candidate handoff cell 1, candidate handoff cell 2, and candidate handoff cell 5. Using CHO, the handoff is initiated in cell 4 when radio conditions are still favorable to maintaining the link with UE 105 and handoff is then prepared to each of the candidate target cells 1, 2 and 5 while the link with source cell 4 is maintained. UE 105 continues measuring signal conditions (e.g., Radio Signal Received Power (RSRP), Radio Signal Received Quality (RSRQ)) in each of the candidate cell target cells and the current source cell, and executes the handoff to one of the candidate handoff cells when the measured signal condition(s) achieve a satisfactory level. By preparing multiple target cells for handoff in advance of handover execution from a source cell, CHO improves handover reliability by reducing the occurrences of handover failure.

Figure 5:
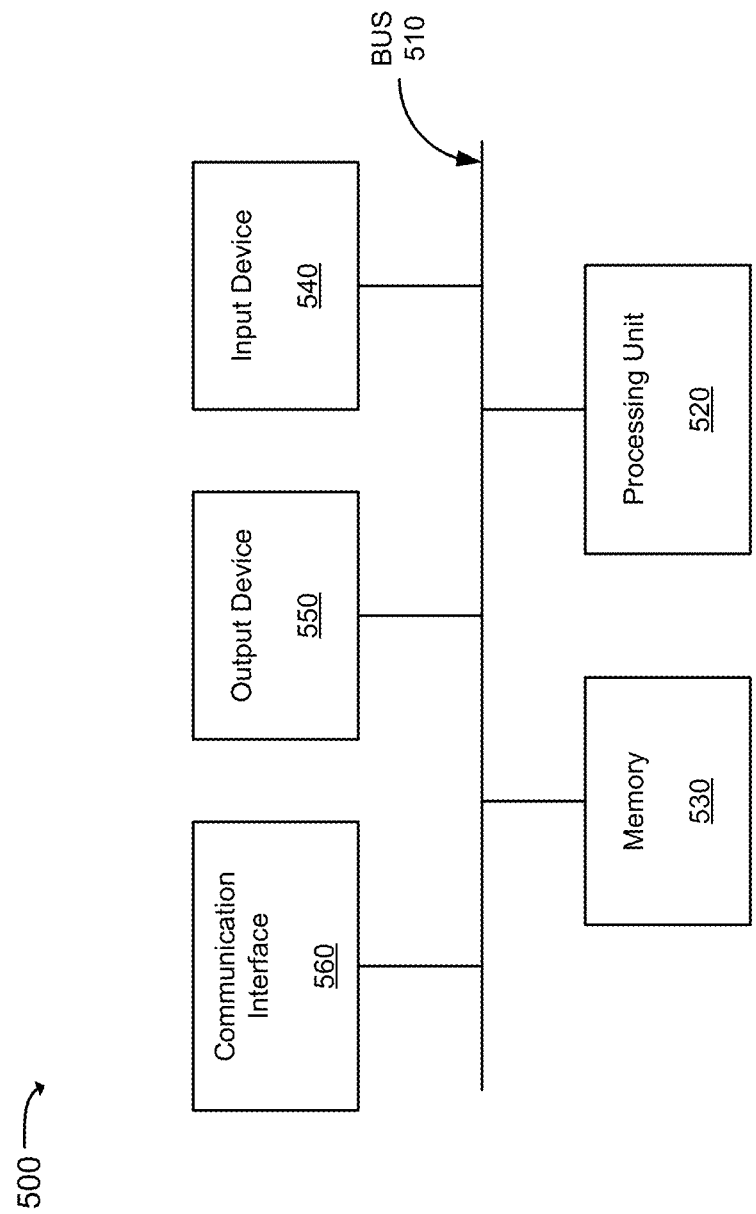
FIG. 5 is a diagram that depicts exemplary components of a device that may correspond to the user equipment devices, remote radio units, and other devices of FIG. 1.

FIG. 5 is a diagram that depicts exemplary components of a device 500. UEs 105, the RRUs of RAN 140, and subscription manager 120 may include the same, or similar, components to those of device 500 shown in FIG. 5. Further, each of the functions UPF 125, SMF 130, AMF 135, UDM 145 and PCF 150 of network 110 may be implemented by a network device that is the same, or similar to, device 500. Some of functions UPF 125, SMF 130, AMF 135, UDM 145 and PCF 150 may be implemented by a same device 500 within network 110, while others of the functions may be implemented by one or more different devices 500 within network 110.

Device 500 may include a bus 510, a processing unit 520, a memory 530, an input device 540, and output device 550, and a communication interface 560. Bus 510 may include a path that permits communication among the components of device 500. Processing unit 320 may include one or more processors or microprocessors, or processing logic, which may interpret and execute instructions. Memory 530 may include one or more memory devices for storing data and instructions. Memory 530 may include a random access memory (RAM) or another type of dynamic storage device that may store information and instructions for execution by processing unit 520, a Read Only Memory (ROM) device or another type of static storage device that may store static information and instructions for use by processing unit 520, and/or a magnetic, optical, or flash memory recording and storage medium. The memory devices of memory 530 may each be referred to herein as a "tangible non-transitory computer-readable medium," "non-transitory computer-readable medium," or "non-transitory storage medium." In some implementations, the processes/methods set forth herein can be implemented as instructions that are stored in memory for execution by processing unit 520.

Input device 540 may include one or more mechanisms that permit an operator to input information into device 500, such as, for example, a keypad or a keyboard, a display with a touch sensitive panel, voice recognition and/or biometric mechanisms, etc. Output device 550 may include one or more mechanisms that output information to the operator, including a display, a speaker, etc. Input device 540 and output device 550 may, in some implementations, be implemented as a user interface (UI) that displays UI information and which receives user input via the UI. Communication interface 560 may include a transceiver(s) that enables device 500 to communicate with other devices and/or systems. For example, communication interface 560 may include one or more wired and/or wireless transceivers for communicating via network 110 and/or data network 115. In the case of RRUs, communication interface 560 may further include antenna arrays, such as the antenna arrays 200 described with respect to FIG. 2.

The configuration of components of device 500 illustrated in FIG. 5 is for illustrative purposes. Other configurations may be implemented. Therefore, device 500 may include additional, fewer and/or different components than those depicted in FIG. 5.

Figure 6:
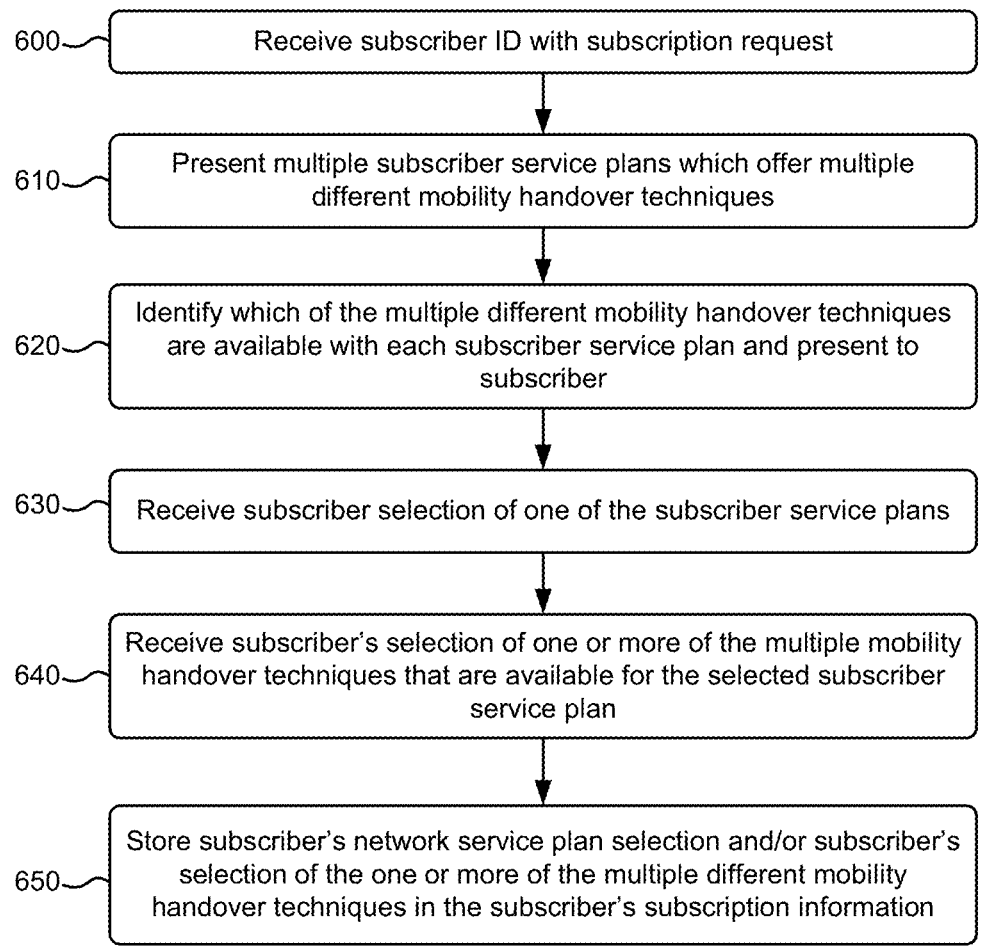
FIG. 6 is a flow diagram that illustrates an exemplary process for receiving subscriber selection of a network service plan and selection of one or more of multiple different mobility handover techniques within the selected network service plan.

FIG. 6 is a flow diagram that illustrates an exemplary process for receiving subscriber selection of a wireless network service plan and possibly including selection of one or more of multiple different mobility handover techniques within the selected network service plan. The exemplary process of FIG. 6 may be implemented by subscription manager 120, and may be repeated each time a subscriber desires to select a network service plan, or desires to change an existing network service plan.

The exemplary process includes subscription manager 120 receiving a subscriber identifier (ID) along with a subscription request (block 600), presenting multiple subscriber plans that each offer multiple different mobility handover techniques (block 610), and identifying which of the multiple different mobility handover techniques are available with each subscriber service and presenting them to the subscriber (block 620). A UE 105, upon user initiation, may execute a web browser, or an application, that generates a user interface such as the exemplary user interface 700 shown in FIG. 7. The user 160 enters a subscriber ID, such as a telephone phone number assigned to the user 160 (e.g., in the case of a VoIP phone line) or to the UE 105 itself (e.g., a mobile phone number), in entry block 705 of user interface 700. Upon entry of the subscriber ID, the web browser or application sends a subscription request to subscription manager 120 which then retrieves multiple different network service plans that are available to this particular subscribing user 160 and presents the multiple network service plans to the user 160 via user interface 700 at UE 105.

Multiple levels of network service plans may be available to the user 160 such as, for example, a basic network service plan that provides X minutes, Y gigabytes (GBs) of data and standard mobility handover techniques; a mid-level network service plan that provides unlimited minutes, Z GBs of data (where Z>Y), and selection of one optional mobility handover technique in addition to, or as an alternative to, standard handover; and a premium network service plan that provides unlimited minutes, unlimited data, and selection of upgraded mobility handover techniques from multiple different optional mobility handover techniques for use in addition to, or as an alternative to, standard handover.

Figure 7:
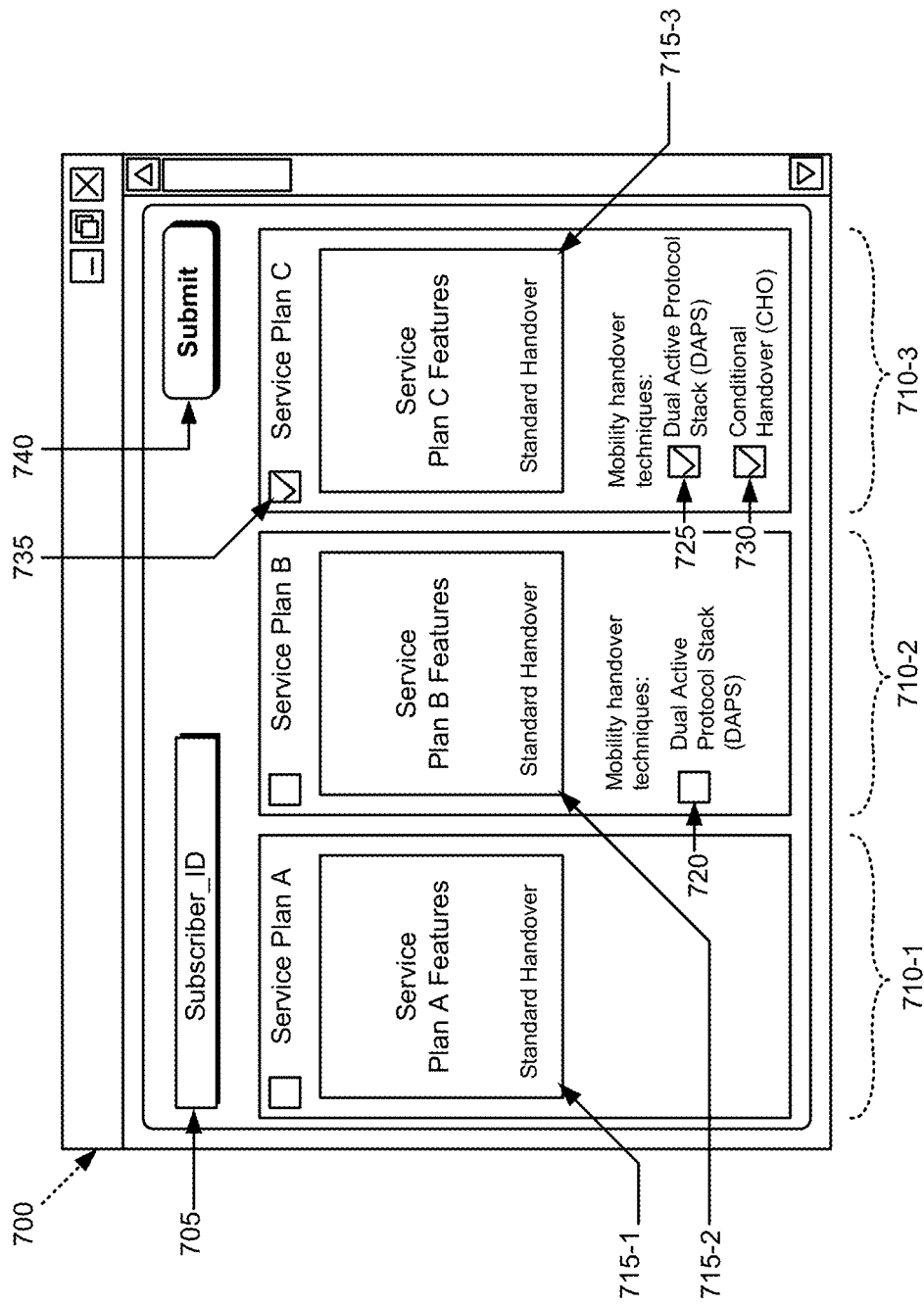
FIG. 7 illustrates an example of a user interface that may be used by a user during the process of FIG. 6.

FIG. 7 depicts an example of the presentation of multiple network service plans 710-1, 710-2 and 710-3 via user interface 700. Network service plan 710-1, identified as "Service Plan A," presents Service Plan A features 715-1, including inclusion of standard handover techniques and no optional upgraded mobility handover techniques. Network service plan 710-2, identified as "Service Plan B," presents Service Plan B features 715-2, including a user selectable optional mobility handover technique upgrade. In this example, a checkbox 720 in "Service Plan B" enables user 160 to select the use of DAPS handover as an upgraded handover technique to use as an alternative to standard handover within mobile network 110. Network service plan 710-3, identified as "Service Plan C," presents Service Plan C features 715-3, including multiple user selectable upgraded mobility handover techniques. In this example, a checkbox 725 in "Service Plan C" enables user 160 to select the use of DAPS handover as an upgraded handover technique and checkbox 730 enables user 160 to also select the use of CHO as an upgraded handover technique. DAPS and/or CHO, if selected via checkboxes 725 and 730, may be used as alternatives to standard handover within mobile network 110. The user 160 may, thus, select checkbox 725 by itself, checkbox 730 by itself, or both of checkboxes 725 and 730. In other embodiments, network service plans 710-1, 710-2 and 710-3 may offer different, default sets of mobility handover techniques to the subscriber and selection of a particular one of the network service plans 710-1, 710-2, and 710-3 automatically selects the default set of mobility handover techniques for the selected network service plan. In these embodiments, the subscriber may not be able to select from the optional and upgraded mobility handover techniques for each network service plan (e.g., checkboxes 720, 725, and 730 are omitted from user interface 700), but implicitly selects the default set of mobility handover techniques associated with a network service plan when that network service plan is selected by the subscriber. For example, Service Plan A may offer standard handover, Service Plan B may offer DAPS handover, and Service Plan C may offer DAPS handover and CHO. In this example, if the subscriber selects Service Plan C for a network service subscription, then the subscriber has implicitly selected DAPS handover and CHO as upgraded mobility handover techniques that are to be included as part of the subscriber's network service subscription.

The subscription manager 120 receives the subscriber's selection of one of the subscriber service plans (block 630) and receives the subscriber's selection of one or more of the multiple mobility handover techniques that are available for the selected subscriber service plan (block 640). Referring to the example of FIG. 7, user 160 may select the checkbox 735 associated with "Service Plan C" and may further select both of checkboxes 725 and 730 under "Service Plan C" to select DAPS and CHO for upgraded mobility handover techniques to be used by RAN 140 of mobile network 110 as UE 105 moves through the network. In some embodiments, blocks 620 and 640 may be omitted from the process such that only the multiple network service subscriber plans are presented to the user, and a different set of upgraded mobility handover techniques may be implicitly associated with each of the multiple network service subscriber plans but not explicitly presented to the network service subscriber. In these embodiments, user selection of a particular network service plan in block 630 automatically selects a default set of one or more standard and/or upgraded mobility handover techniques that are offered for that particular network service plan for inclusion in the user's network service subscription.

The subscription manager 120 stores the subscriber's network service plan selection and/or the selection of the one or more of the multiple different mobility handover techniques in the subscriber's subscription information (block 650). Subscription manager 120 may store the subscriber's selection network service plan and/or the subscriber's mobility handover selections in local memory and/or in UDM 145 for future retrieval. When storing the subscription information, subscription manager 120 may store a first data type that indicates whether optional and upgraded mobility handover techniques are allowed for the subscriber and may further store a second data type that indicates which optional and upgraded mobility handover techniques are allowed for this subscriber. In one implementation, the first data type may include a binary flag in which the flag being set (F=1) indicates that optional and upgraded mobility handover techniques are allowed for the subscriber and the flag being reset (F=0) indicates that optional and upgraded mobility handover techniques are not allowed for the subscriber. The second data type may further include a data string that indicates the one or more mobility handover techniques of multiple different optional and upgraded mobility handover techniques that were subscriber selected. For example, the data string of the second data type may indicate each of the mobility handover techniques allowed for the subscriber in a hexadecimal representation.

Figure 8A:
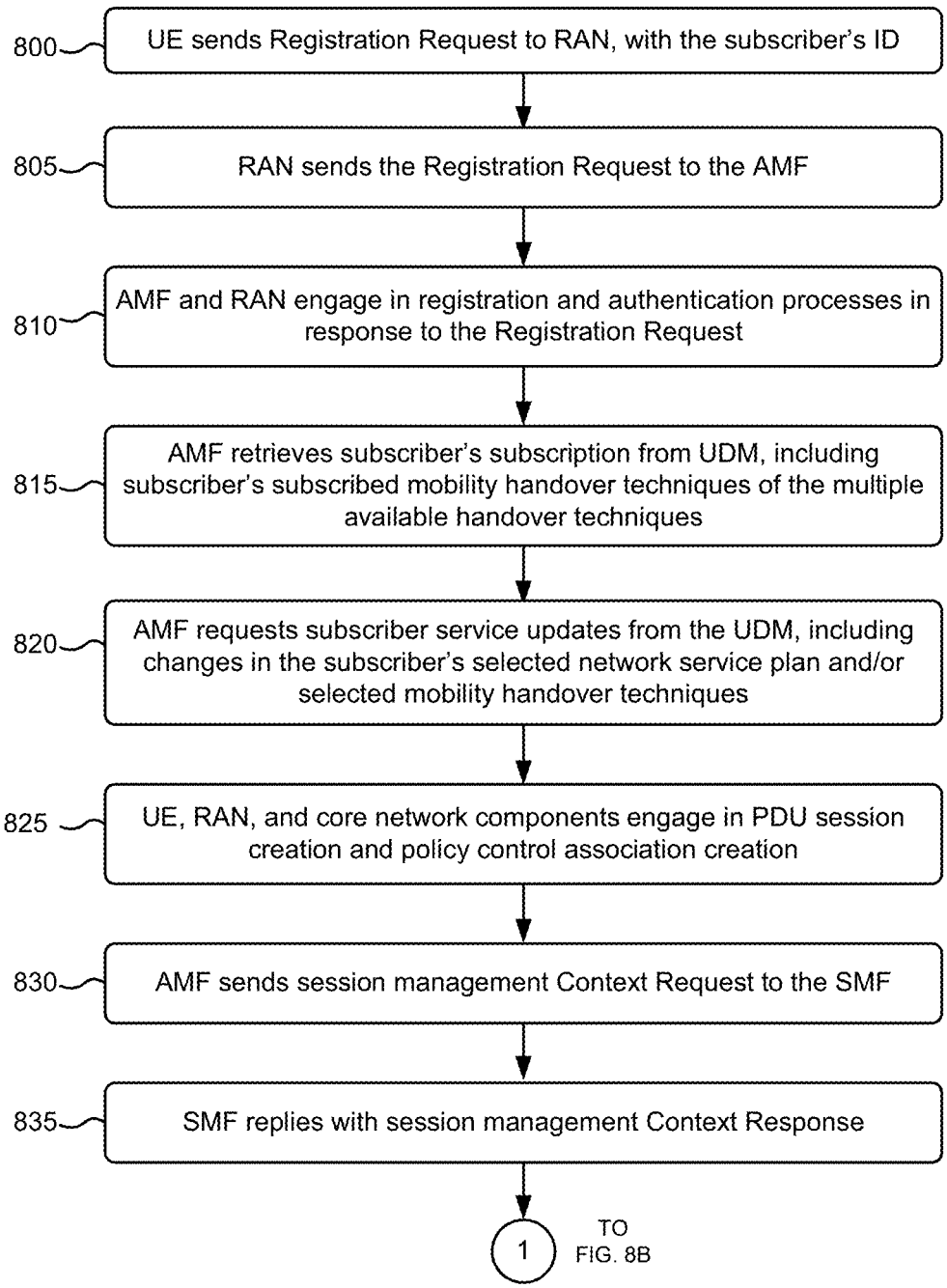
FIGS. 8A and 8B are flow diagrams that illustrate an exemplary process for registering a user equipment device with the mobile network of FIG. 1 and for identifying one or more mobility handover techniques selected and subscribed by the user of the user equipment device.
Figure 8B:
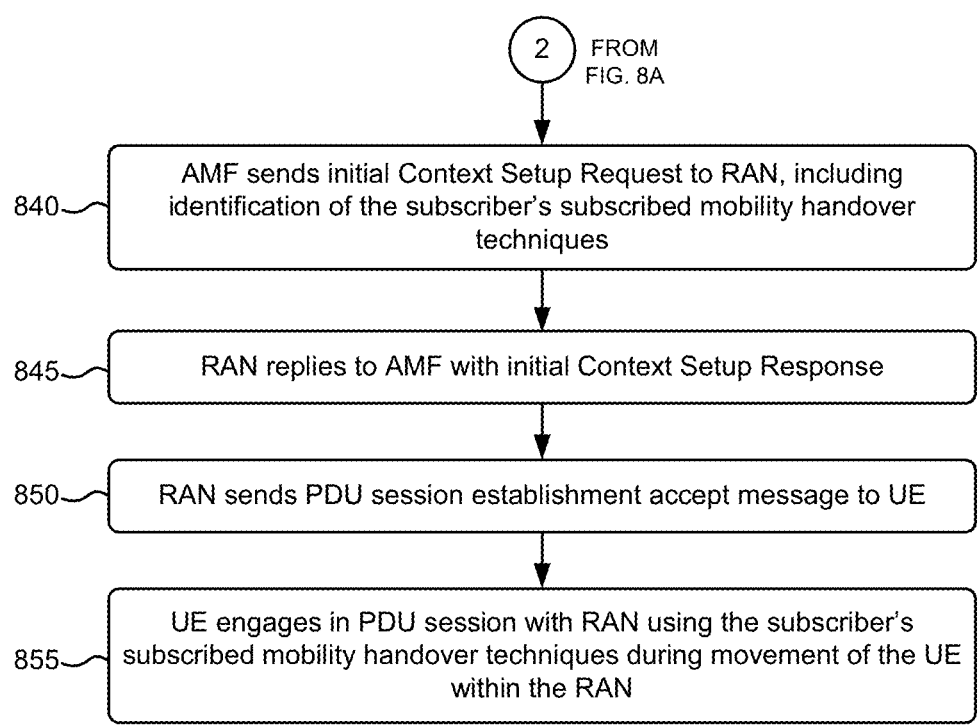

FIGS. 8A and 8B are flow diagrams that illustrate an exemplary process for registering a UE 105 with mobile network 110 and for identifying one or more mobility handover techniques selected and subscribed by the user of the UE 105. The exemplary process of FIGS. 8A and 8B may be implemented by a UE 105 in conjunction with components of mobile network 110 (e.g., RAN 140, AMF 135, SMF 130, UDM 145, etc.). The exemplary process of FIGS. 8A and 8B may be repeated each time a UE 105 sends a registration request to request network service from mobile network 110.

Figure 9:
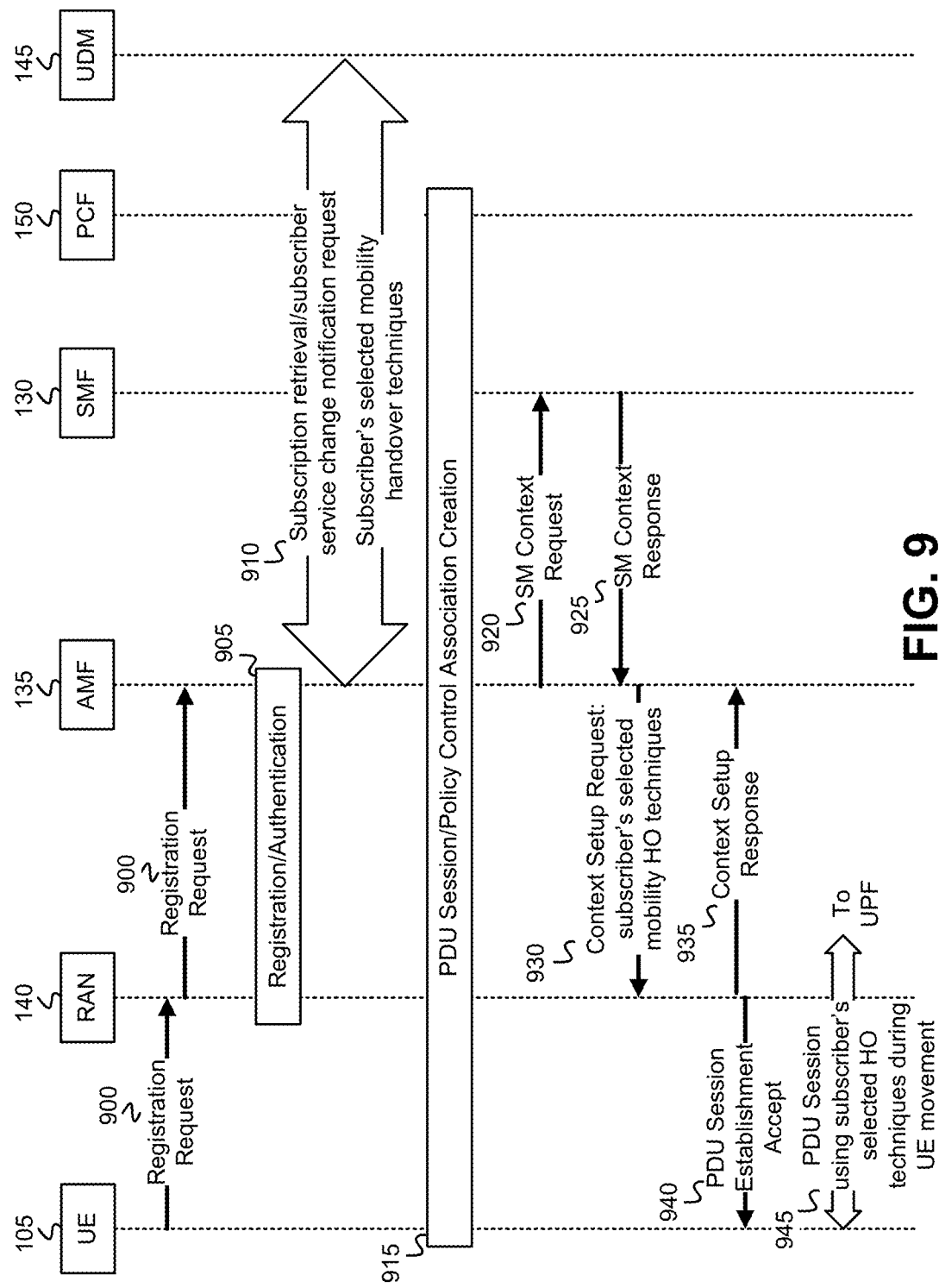
FIG. 9 depicts exemplary operations, messages, and data flows associated with the exemplary process of FIGS. 8A and 8B.

The exemplary process includes UE 105 sending a Registration Request to RAN 140 with the subscriber's ID (block 800), RAN 140 sending the Registration Request on to AMF 135 (block 805), and AMF 135 and RAN 140 engaging in registration and authentication processes in response to the Registration Request (block 810). The subscriber's ID may include, for example, the cellular telephone number of the UE 105, or a unique ID assigned to the user/subscriber 160 of the UE 105. UE 105 may send the Registration Request to RAN 140 at UE 105 power-up to register with mobile network 110 such that UE 105 may begin receiving mobile network service from mobile network 110. AMF 135, subsequent to receiving the Registration Request from RAN 140, engages with RAN 140 in existing network registration and authentication processes to register and authenticate the UE 105 with mobile network 110. FIG. 9 illustrates UE 105 sending a Registration Request 900 to RAN 140, and RAN 140 forwarding the Registration Request 900 on to AMF 135. FIG. 9 further shows RAN 140 and AMF 135 engaging in a Registration/Authentication processes 905 to register and authenticate UE 105 with the mobile network 110.

AMF 135 retrieves the subscriber's subscription information from UDM 145, including the subscriber's subscribed mobility handover techniques of the multiple available handover techniques (block 815), and requests subscriber network service updates/changes from the UDM 145, including changes in the subscriber's selected network service plan and/or selected mobility handover techniques (block 820). UDM 145 may store the user/subscriber 160's subscribed network service plan and/or mobility handover techniques that the user/subscriber 160 selected in blocks 630 or 640 of the process of FIG. 6, and AMF 135 may retrieve the stored subscriber information from UDM 145 via mobile network 110. AMF 135 requests notification of updates or changes in the user/subscriber 160's subscribed network service such that if the user/subscriber 160 repeats blocks of the process of FIG. 6 to, for example, re-select the user 160's network service plan and/or one or more upgraded mobility handover techniques, then UDM 145 sends a notification to AMF 135 alerting the AMF 135 to the change in the user 160's network service subscription. FIG. 9 depicts AMF 135 retrieving 910 the user 160's subscription information from UDM 145, and requesting subscriber service change notifications. The retrieved subscription information includes the subscriber's subscribed mobility handover technique upgrades.

UE 105, RAN 140, and the core components of mobile network 110 engage in PDU session creation and policy control association creation (block 825). UE 105, components of RAN 140, and other core components of mobile network 110 engage in existing procedures for PDU session creation. UE 105, components of RAN 140, and other core components of mobile network 110 (e.g., PCF 150) also engage in existing procedures for policy control association creation. FIG. 9 illustrates UE 105, RAN 140, AMF 135, SMF 130 and PCF 150 engaging in PDU session creation and policy control association creation.

AMF 135 sends a session management (SM) Context Request to the SMF 130 (block 830), and SMF 130 replies with a SM Context Response (block 835). The SM Context Request and Context Response exchange results in the establishment of a PDU session for the UE 105 by SMF 130. FIG. 9 depicts AMF 135 sending a SM Context Request message 920 to SMF 130, and SMF 130 returning a SM Context Response message 925 to AMF 135.

AMF 135 sends an initial Context Setup Request to RAN 140, including identification of the subscriber's subscribed mobility handover techniques (block 840), and RAN 140 replies to AMF 135 with an initial Context Setup response (block 845) and then sends a PDU session establishment accept message to UE 105 (block 850). The Context Setup Request and Context Setup Response exchanged between AMF 135 and RAN 140 (e.g., a RRU of RAN 140) notifies RAN 140 of the established PDU session, and provides information regarding the user/subscriber 160's selected and subscribed mobility handover techniques to RAN 140 for subsequent use in conducting handoff for the user/subscriber 160's UE 105 as the UE 105 moves between cells in the RAN 140. The data in the Context Setup Request message may include the first and second data types described above with respect to block 650 of FIG. 6. The first data type may indicate whether optional and upgraded mobility handover techniques of multiple different mobility handover techniques are allowed for the subscriber. The second data type may indicate which optional and upgraded mobility handover techniques of the multiple different mobility handover techniques are allowed for this subscriber. FIG. 9 illustrates AMF 135, subsequent to receipt of the SM Context Response message 925 from SMF 130, sending a Context Setup Request message 930 to RAN 140 that includes data identifying the subscriber's selected and subscribed mobility handover techniques. Upon receipt of message 930, RAN 140 replies with a Context Setup Response message 935, and sends a PDU session establishment accept message 940 to UE 105 to notify UE 105 of the established PDU session.

UE 105 then engages in a PDU session with RAN 140 using the subscriber's subscribed mobility handover techniques during movement of the UE 105 within the RAN 140 (block 855). UE 105 and RAN 140 (e.g., a RRU of RAN 140) cooperatively engage in the optional and upgraded mobility handover technique(s) identified as the subscriber's subscribed techniques in block 840. A RRU of RAN 140 may, therefore, execute the one or more different mobility handover techniques, subscribed to by the user for maintaining wireless communication with the UE 105, as the UE 105 moves within mobile network 110. For example, if DAPS and/or CHO are the optional and upgraded mobility handover techniques identified in the subscriber's subscribed handover techniques, then UE 105 and RAN 140 may cooperatively engage in DAPS and/or CHO during handover of UE 105 from cell to cell within RAN 140 during movement of UE 105. Referring to the example depicted in FIG. 7, if user/subscriber 160 selects the DAPS (via checkbox 725) and/or CHO (via checkbox 730) upgraded and optional mobility handover techniques as part of the user 160's network service plan, then RAN 140 may executes the DAPS and/or CHO handover techniques during handoff of the user/subscriber 160's UE 105 from one cell in RAN 140 to another cell in RAN 140. FIG. 9 shows UE 105, subsequent to receipt of the PDU session establishment accept message 940, engaging in a PDU session 945 with RAN 140 and mobile network 110, where the subscriber's subscribed handover techniques are used to hand off the UE 105 from cell to cell within RAN 140 as the UE 105 moves across the geographic area covered by the cells of RAN 140.

Figure 10:
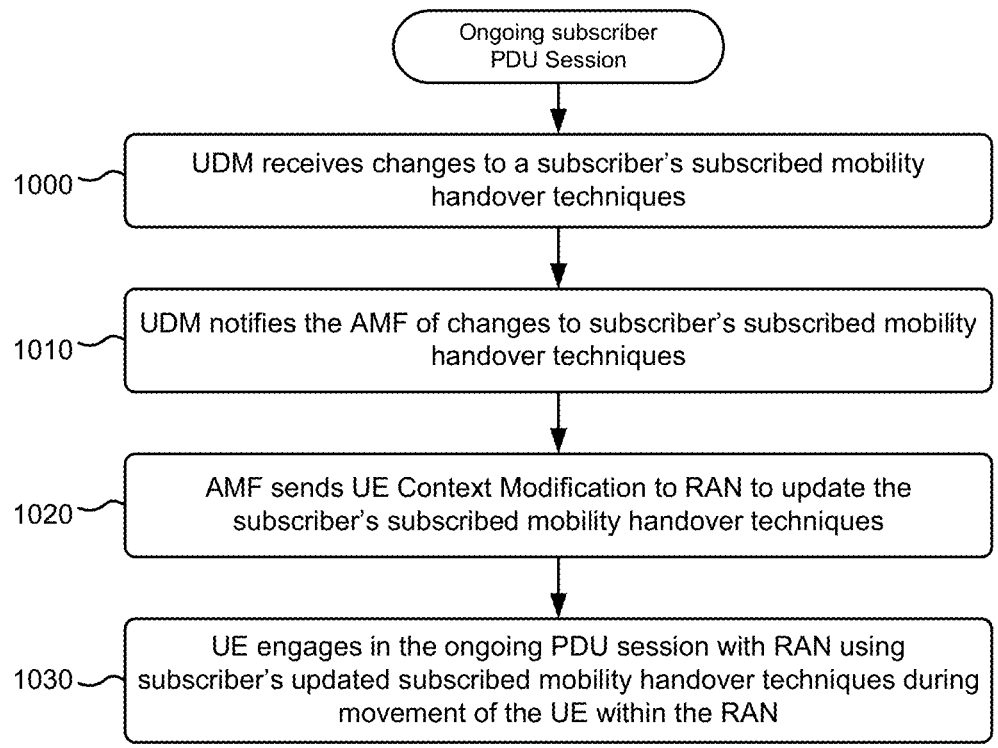
FIG. 10 is a flow diagram that illustrates an exemplary process for changing/updating subscriber selected mobility handover techniques that are used to maintain network service to a subscriber's user equipment device during movement of the user equipment device.

FIG. 10 is a flow diagram that illustrates an exemplary process for changing/updating subscriber selected mobility handover techniques that are used to maintain network service to a subscriber's UE 105 during movement of the UE 105 within the geographic area covered by the RAN 140 of the mobile network 110. The exemplary process of FIG. 10 may be implemented by components of mobile network 110 (e.g., UDM 145, AMF 135, etc.). The exemplary process of FIG. 10 may be repeated each time a change occurs in a subscriber's subscribed mobility handover techniques during an ongoing PDU session involving that subscriber.

Figure 11:
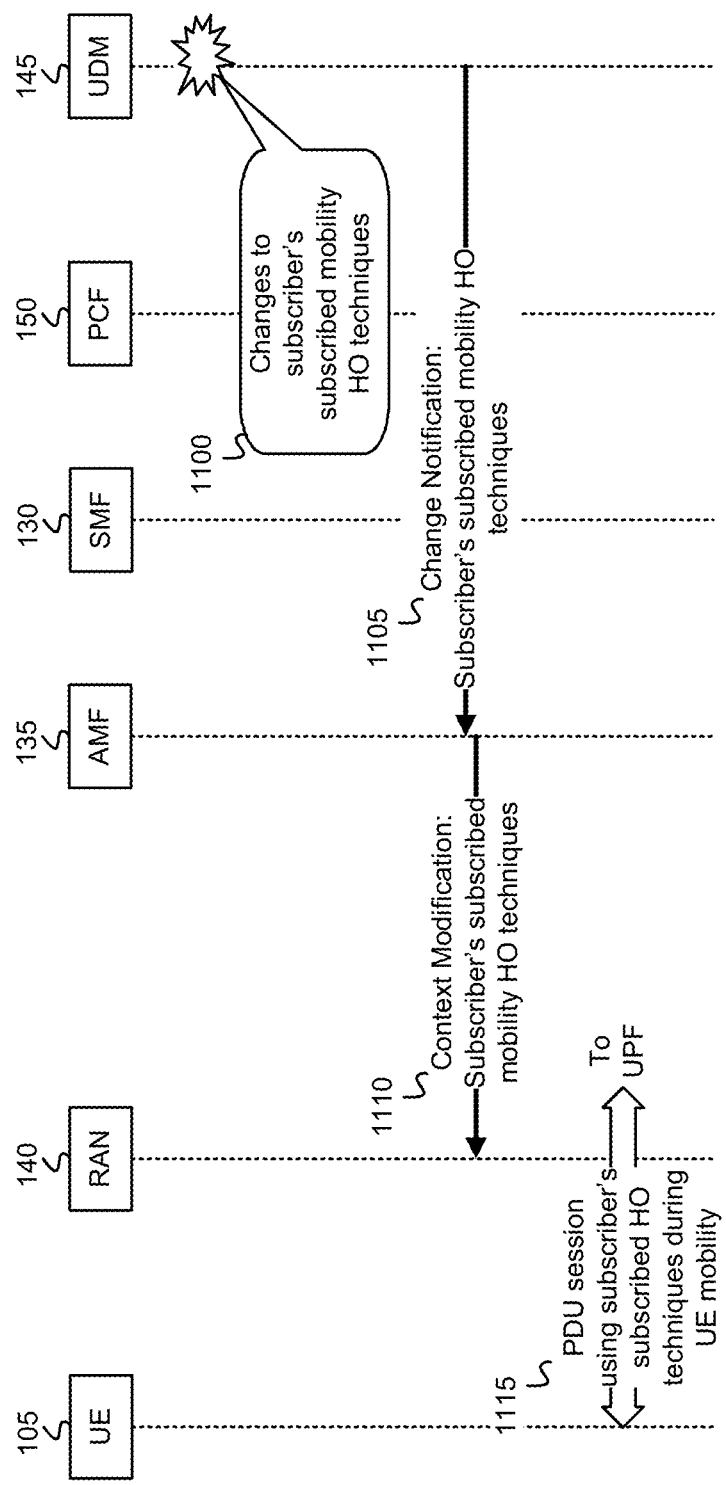
FIG. 11 depicts exemplary operations, messages, and data flows associated with the exemplary process of FIG. 10.

The exemplary process includes UDM 145 receiving changes to a subscriber's subscribed mobility handover techniques (block 1000), and notifying the AMF 135 of changes to the subscriber's subscribed mobility handover techniques responsive to the received changes (block 1010). For example, if during repeat of blocks 630 and/or 640 of the process of FIG. 6, user/subscriber 160 changes the user's network service plan and/or the user's upgraded mobility handover techniques, then UDM 145 sends a notification to AMF 135 alerting AMF 135 to the changes in the user's subscribed mobility handover techniques. The data in the change notification message from UDM 145 to AMF 135 may include the first and second data types described above with respect to block 650 of FIG. 6. The first data type may indicate whether optional and upgraded mobility handover techniques are allowed for the subscriber. The second data type may indicate which optional and upgraded mobility handover techniques are allowed for this subscriber. FIG. 11 depicts UDM 145 receiving 1100 changes to a subscriber's subscribed mobility handover techniques, and UDM 145 sending a Change Notification message 1105 that includes data that identifies the subscriber's currently subscribed mobility handover techniques.

AMF 135, upon receipt of the notification from UDM 145, sends a UE Context Modification to RAN 140 to update the subscriber's subscribed mobility handover techniques (block 1020). The UE Context Modification message includes data that identifies whether optional mobility handover techniques are allowed for this user/subscriber 160, and identifies the particular one or more optional mobility handover techniques allowed for this user/subscriber 160. FIG. 11 illustrates AMF 135, upon receipt of the Change Notification message 1105 from UDM 145, sending a Context Modification message 1110 to RAN 140 that includes the data that identifies the subscriber's currently subscribed mobility handover techniques.

The subscriber's UE 105 engages in the ongoing PDU session with RAN 140 using the subscriber's updated subscribed mobility handover techniques during movement of the UE 105 within the geographic area covered by the RAN 140 (block 1030). UE 105 and RAN 140 (e.g., the RRU of RAN 140) cooperatively engage in the updated mobility handover technique(s) identified as the subscriber's subscribed techniques in block 1000. For example, if DAPS was the previously subscribed handover technique for the user/subscriber 105, and CHO is added to the subscriber's network subscription, then UE 105 and RAN 140 may cooperatively engage in both DAPS and CHO during handover of UE 105 from cell to cell within RAN 140 during movement of UE 105. FIG. 11 shows UE 105, subsequent to receipt of the Context Modification message 1110, engaging in a PDU session 1115 with RAN 140 and mobile network 110, where the subscriber's updated subscribed handover techniques are used to hand off the UE 105 from cell to cell within RAN 140 as the UE 105 moves across the geographic area covered by the cells of RAN 140.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6, 8A, 8B, and 10, and sequences of operations, messages, and/or data flows with respect to FIGS. 9 and 11, the order of the blocks and/or the operations, messages, and/or data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 520) of a device. A non-transitory storage medium includes one or more of the storage mediums described in relation to memory 530. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such.

Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device in a wireless network from a mobile user equipment device (UE) associated with a user, a wireless network service request;
   obtaining, by the device, the user's subscribed mobility handover techniques, wherein the user's subscribed mobility handover techniques include one or more mobility handover techniques selected by the user from multiple different mobility handover techniques associated with at least one wireless network service plan; and
   executing the one or more different mobility handover techniques selected by the user for maintaining wireless communication with the mobile UE as the mobile UE moves within the wireless network.

2. The method of claim 1, wherein executing the one or more different mobility handover techniques comprises:
   executing a user-selected first one of the multiple different mobility handover techniques; and
   executing a user-selected second one of the multiple different mobility handover techniques.

3. The method of claim 1, further comprising:
   sending, from the device to the wireless network's Radio Access Network (RAN), a message that includes an identification of the user's subscribed mobility handover techniques.

4. The method of claim 1, wherein the one or more mobility handover techniques selected from the multiple different mobility handover techniques include one or more upgraded mobility handover techniques that enhance mobility handover performance in the wireless network.

5. The method of claim 1, wherein the one or more mobility handover techniques selected from multiple different mobility handover techniques comprise a Dual Active Protocol Stack (DAPS) handover technique or a Conditional Handover (CHO) technique.

6. The method of claim 1, wherein the at least one wireless network service plan comprises multiple wireless network service plans and wherein the one or more mobility handover techniques are associated with a user-selected wireless network service plan of the multiple wireless network service plans.

7. The method of claim 1, further comprising:
   presenting multiple network service plans to the user;
   presenting optional mobility handover techniques within one or more of the multiple network service plans;
   receiving the user's selection of one of the multiple network service plans; and
   receiving the user's selection of the one or more mobility handover techniques from the optional mobility handover techniques, and
   storing, as the user's subscribed mobility handover techniques, the user-selected one or more mobility handover techniques.

8. The method of claim 7, wherein obtaining the user's subscribed mobility handover techniques comprises:
   retrieving the user's subscribed mobility handover techniques from storage.

9. The method of claim 1, wherein the device comprises a Remote Radio Unit (RRU) of the Radio Access Network (RAN), or implements an Access and Mobility Management Function (AMF), within the wireless network.

10. A device, comprising:
    a communication interface connected within a wireless network and configured to receive, from a mobile user equipment device (UE) associated with a user, a wireless network service request; and
    a processor configured to:
      obtain, via the communication interface, the user's subscribed mobility handover techniques, wherein the user's subscribed mobility handover techniques include one or more mobility handover techniques selected by the user from multiple different mobility handover techniques associated with at least one wireless network service plan, and
      execute the one or more different mobility handover techniques selected by the user for maintaining wireless communication with the mobile UE as the mobile UE moves within the wireless network.

11. The device of claim 10, wherein, when executing the one or more different mobility handover techniques, the processor is further configured to:
    execute a user-selected first one of the multiple different mobility handover techniques; and
    execute a user-selected second one of the multiple different mobility handover techniques.

12. The device of claim 10, wherein, when executing the one or more mobility handover techniques selected by the user, the processor is further configured to:
    receive, via the communication interface from a function in the wireless network, a message that includes an identification of the user's subscribed mobility handover techniques.

13. The device of claim 10, wherein the one or more mobility handover techniques selected from the multiple different mobility handover techniques include one or more upgraded mobility handover techniques that enhance mobility handover performance in the wireless network.

14. The device of claim 10, wherein the one or more mobility handover techniques selected from multiple different mobility handover techniques by the user comprise a Dual Active Protocol Stack (DAPS) handover technique or a Conditional Handover (CHO) technique.

15. The device of claim 10, wherein the at least one wireless network service plan comprises multiple wireless network service plans and wherein the one or more mobility handover techniques are associated with a user-selected wireless network service plan of the multiple wireless network service plans.

16. The device of claim 10, wherein the device comprises a Remote Radio Unit (RRU) of a Radio Access Network (RAN) within the wireless network.

17. A non-transitory storage medium storing instructions executable by a device, wherein the instructions comprise instructions to cause the device to:
- receive, from a mobile user equipment device (UE) associated with a user, a request for service in a wireless network;
- obtain the user's subscribed mobility handover techniques, wherein the user's subscribed mobility handover techniques include one or more mobility handover techniques selected by the user from multiple different mobility handover techniques associated with at least one wireless network service plan; and
- execute the one or more different mobility handover techniques selected by the user for maintaining wireless communication with the mobile UE as the mobile UE moves within the wireless network.

18. The non-transitory storage medium of claim 17, wherein the instructions for obtain the user's subscribed mobility handover techniques further comprise instructions to cause the network device to:
- receive, from a function in the wireless network, a message that includes an identification of the user's subscribed mobility handover techniques.

19. The network device of claim 17, wherein the one or more mobility handover techniques selected from the multiple different mobility handover techniques include one or more upgraded mobility handover techniques that enhance mobility handover performance in the wireless network.

20. The network device of claim 17, wherein the one or more mobility handover techniques selected from multiple different mobility handover techniques by the user comprise a Dual Active Protocol Stack (DAPS) handover technique or a Conditional Handover (CHO) technique.

* * * * *